United States Patent
Komori et al.

(10) Patent No.: US 6,444,361 B1
(45) Date of Patent: Sep. 3, 2002

(54) ACTIVE MATERIAL FOR HYDROGEN STORAGE ALLOY ELECTRODE AND METHOD FOR PRODUCING THE SAME

(75) Inventors: Katsunori Komori, Toyohashi (JP); Hiromu Matsuda, Hyogo (JP); Yoshinori Toyoguchi, Yao (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 79 days.

(21) Appl. No.: 09/593,608

(22) Filed: Jun. 12, 2000

(30) Foreign Application Priority Data

Jun. 14, 1999 (JP) .......................... 11-166752

(51) Int. Cl.$^7$ ................................ H01M 4/58
(52) U.S. Cl. .................... 429/218.2; 429/209; 429/223; 429/224
(58) Field of Search .............. 429/209, 218.2, 429/223, 224

(56) References Cited

U.S. PATENT DOCUMENTS 5,451,474 A    9/1995 Wu et al. ...................... 429/59
5,536,591 A    7/1996 Fetcenko et al. ............. 429/59
6,277,519 B1 * 8/2001 Ishii et al. ................ 429/218.2

FOREIGN PATENT DOCUMENTS

| EP | 02256161 | 10/1990 |
| EP | 05101821 | 4/1993 |
| EP | 0591606 A1 | 1/1994 |
| JP | 61-168866 | 7/1986 |
| JP | 61-176063 | 8/1986 |
| JP | 1-197965 | 8/1989 |
| JP | 4-179055 | 6/1992 |
| JP | 4-245165 | 9/1992 |
| JP | 5-266887 | 10/1993 |
| JP | 6-21576 | 1/1994 |
| JP | 7-94176 | 4/1995 |
| JP | 7-286225 | 10/1995 |
| JP | 9-298059 | 11/1997 |

* cited by examiner

*Primary Examiner*—Carol Chaney
*Assistant Examiner*—Dah-Wei Yuan
(74) *Attorney, Agent, or Firm*—McDermott, Will & Emery

(57) ABSTRACT

Disclosed is an active material for a hydrogen storage alloy electrode which can provide a nickel-metal hydride storage battery having a longer cycle life than any conventional battery. The active material has a core alloy of a hydrogen storage alloy and a surface layer comprising iron compound formed on the surface of the core alloy.

7 Claims, 5 Drawing Sheets

ACTIVE MATERIAL FOR HYDROGEN STORAGE ALLOY ELECTRODE AND METHOD FOR PRODUCING THE SAME

BACKGROUND OF THE INVENTION

The present invention relates to an active material for a hydrogen storage alloy electrode such as the negative electrode of a nickel-metal hydride storage battery, and to a method for producing the active material.

Recently, the nickel-metal hydride storage battery comprising, for the negative electrode, a hydrogen storage alloy capable of reversibly absorbing therein and desorbing therefrom hydrogen has been noted as a secondary battery of high energy density and long cycle life. With increased performance and diversification of portable appliances and development of new types of electric vehicles and hybrid cars which use the secondary battery as their power source, production of nickel-metal hydride storage battery has been increased in place of other conventionally used secondary batteries such as nickel-cadmium storage battery.

In the use for electric vehicles for example, however, there is a desire for a battery which can yield a high output allowing repeated charge/discharge cycles for about as long as a decade. The conventional nickel-metal hydride storage battery is not satisfactory in cycle life for such uses.

For improving cycle life of the battery, a variety of surface treatments for the hydrogen storage alloy and use of various additives to the negative electrode have been proposed as the techniques for inhibiting corrosion of hydrogen storage alloy.

For example, in the Japanese Laid-Open Patent Publication No. Sho 61-168866, it is suggested that the hydrogen storage alloy of the negative electrode is imparted corrosion resistance by plating the hydrogen storage alloy particle with Cu and making it into a microcapsule to give a long cycle life to the battery.

It is also suggested in the Japanese Laid-Open Patent Publications No. Hei 4-245165 and No. Hei 7-94176 that the negative electrode is added an alloy containing iron or iron compound as additives.

It is also suggested in the Japanese Laid-Open Patent Publication No. Hei 6-21576 that oxidation of the negative electrode is inhibited by incorporating yttrium in the negative electrode.

The above-mentioned prior art which microcapsulates the hydrogen storage alloy particle, however, is not fit for mass production because of high production cost and small capacity density of the obtained negative electrode.

The prior art which uses the additive such as iron compound for the negative electrode simply mixes the additive with electrode materials and is not intended to uniformly deposit the additive on the surface of alloy particle. With this technique, therefore, the deposition of iron on the alloy particle surface is not uniform and there occur iron-poor areas and iron-rich areas in the surface. Moreover, since iron has a poor solubility in alkaline solution, the deposited amount of iron on the alloy particle surface is small even if iron can be deposited after being released from the additive to the alkaline solution. This results in failure of formation of the surface layer comprising iron compound and the obtained inhibiting effect on corrosion is only small.

Despite a variety of alternatives including surface treatments for the hydrogen storage alloy particle, such as alkali treatment as suggested in the Japanese Laid-Open Patent Publication No. Sho 61-176063 and acid treatment :as suggested in the Japanese Laid-Open Patent Publication No. Hei 4-179055 which primarily aim at enhancing initial activation of the battery by increasing conductivity in the alloy particle surface portion, and use of additives to the negative electrode, such as addition of Co as suggested in the Japanese Laid-Open Patent Publication No. Hei 1-197965 and addition of Fe as suggested in the Japanese Laid-Open Patent Publication No. Hei 5-266887, hydrogen storage alloy electrode having a satisfactory cycle life has not been obtained.

BRIEF SUMMARY OF THE INVENTION

In view of the above-mentioned drawbacks of the prior art, the object of the present invention is to provide an active material for a hydrogen storage alloy electrode to obtain A nickel-metal hydride storage battery having a longer cycle life than any conventional nickel-metal hydride storage battery.

The present invention is directed to an active material for a hydrogen storage alloy electrode, having A core alloy of a hydrogen storage alloy and a surface layer comprising iron compound formed on the surface of the core alloy.

In other words, the present invention is related to an active material for a hydrogen storage alloy electrode having a core alloy and a surface layer formed on the surface of the core alloy, the core alloy comprising a hydrogen storage alloy and the surface layer comprising iron compound.

In a preferred mode of the present invention, the iron compound is an iron oxide or iron hydroxide.

In another preferred mode of the present invention, an iron content ratio in the surface layer is 5 to 40 mol % of all metal content in the surface layer. In this case, it is further preferred that the core alloy contains iron at a lower content ratio to all metal contained in the core alloy than the iron content ratio it the surface layer to all metal contained in the surface layer.

It is also preferred that the core alloy is represented by the general formula: $MmNi_aFe_bM_c$, where Mm is a Misch metal or a mixture of rare earth elements, M is at least one selected from the group consisting of Mn, Al, Cu and Co, $0.05 \leq b \leq 0.8$ and $5.0 \leq a+b+c \leq 5.5$.

In still another preferred mode of the present invention, a crystal exists between the core alloy and the surface layer, the crystal comprising at least one selected from the group consisting of metallic nickel, metallic cobalt, nickel oxide and cobalt oxide.

It is also desirable that the core alloy contains Co and has A magnetic susceptibility of $0.3 + A \times 6.06$ emu/g (emu/g= $(4\pi)^2 \times 10^{-10}$ $Hm^2$/kg) or more, where A is percent by weight of Co in the core alloy.

The present invention is also directed to a method for producing an active material for a hydrogen storage alloy electrode comprising the step of mechanically mixing a core alloy of a hydrogen storage alloy with an iron compound having a mean particle size of one-tenth or less the mean particle size of the core alloy to form a surface layer comprising iron compound on the surface of the core alloy.

In another mode of the method of the present invention for producing an active material for a hydrogen storage alloy electrode, the method comprises the steps of immersing a core alloy of a hydrogen storage alloy in an aqueous solution containing an inorganic acid salt of iron (a salt of inorganic acid and iron) dissolved therein, adding an aqueous alkaline solution to the aqueous solution containing the core alloy to form a surface layer comprising iron compound on the surface of the core alloy, and then washing the core alloy with the surface layer to remove alkali.

In still another mode of the method of the present invention for producing an active material for a hydrogen storage alloy electrode, the method comprises the steps of immersing a core alloy of a hydrogen storage alloy containing iron into an aqueous alkaline solution to form a surface layer comprising iron compound on the surface of the core alloy, and then washing the core alloy with the surface layer to remove alkali.

While the novel features of the invention are set forth particularly in the appended claims, the invention, both as to organization and content, will be better understood and appreciated, along with other objects and features thereof, from the following detailed description.

DETAILED DESCRIPTION OF THE INVENTION

Figure 1:
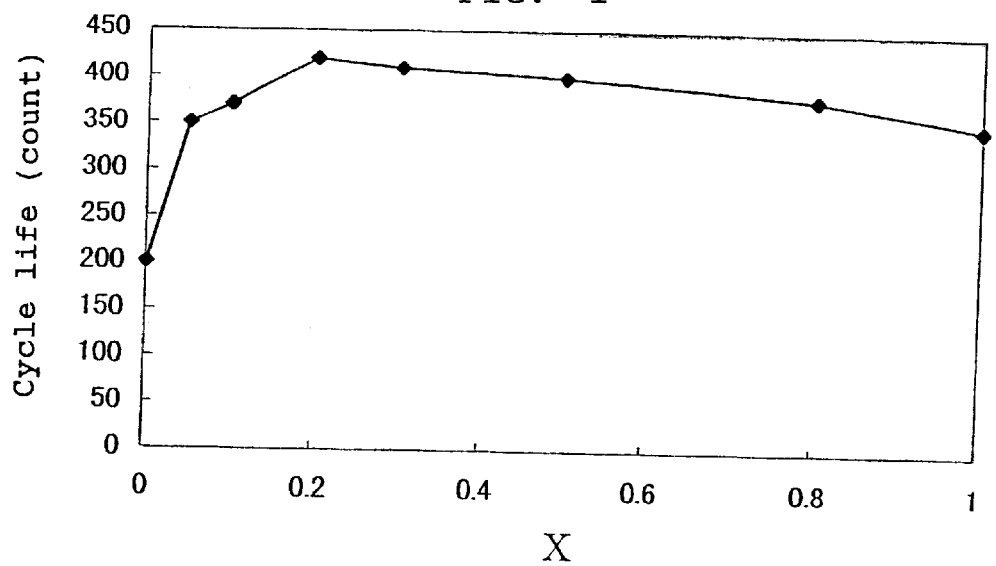
FIG. 1 is a graph illustrating the relation between x value and battery cycle life in the test batteries comprising either active material in accordance with Examples 6 to 12 and Comparative Example 5 produced by immersing the alloys represented by the formula (1) $MmNi_{3.6-x}Mn_{0.4}Al_{0.3}Co_{0.7}Fe_x$ in an aqueous KOH solution at 90°C. having a specific gravity of 1.30 for one hour.

Corrosion and oxidation of the hydrogen storage alloy are major factors for shortening the cycle life of the nickel-metal hydride storage battery. When the hydrogen storage alloy used for the negative electrode active material of the nickel-metal hydride storage battery is exposed to an aqueous alkaline solution serving as the electrolyte, elements such as Al and Mn start to dissolve from the alloy into the solution and then surface of the alloy is coated with an oxide or hydroxide of some of the elements composing the alloy such as rare earth elements.

In the present invention, an active material having a core alloy of a hydrogen storage alloy and a surface layer comprising iron compound formed on the surface of the core alloy is used. By doing so, the dissolution rate of the elements composing the alloy into the aqueous alkaline solution and the production rate of the oxide or hydroxide are decreased. Therefore, the use of this active material for the electrode is effective in improving battery cycle life. It is desirable to form the surface layer comprising iron compound on the surface of the core alloy as uniformly as possible.

The reason why the iron compound is particularly used for the surface layer is that such compound is relatively stable even in the aqueous alkaline solution.

Exemplary iron compounds for the surface layer may include iron oxides such as FeO and $Fe_2O_3$, iron hydroxides such as $Fe(OH)_2$ and $Fe(OH)_3$, and iron oxyhydroxides such as FeOOH. Amoung them, $Fe(OH)_3$ and $Fe_2O_3$ are preferable.

The surface layer may comprise one or more iron compounds, and may further comprise other component than the iron compounds.

The iron content ratio in the surface layer (hereinafter referred to as "surface iron content ratio") is preferably 5 to 40 mol % and more preferably 10 to 40 mol % of all metal content in the surface layer from the aspect of inhibiting effect on the corrosion and oxidation of the core alloy.

Lower surface iron content ratios only offer the similar effect to that of the conventional electrode using a mere mixture of hydrogen storage alloy with an iron compound. The surface iron content ratio can be measured with some surface analysis such as electron probe microanalysis (EPMA) and electron spectroscopy for chemical analysis (ESCA).

How the surface layer comprising iron compound is formed on the surface of the core alloy can be observed and evaluated with a surface analysis apparatus such as transmission electron microscopy (TEM) and electron probe microanalyzer.

The core alloy normally has a mean particle size of 10 to 30 μm.

When the core alloy contains iron, it is preferable that the iron content ratio in the core alloy is lower than the surface iron. content ratio, because of a great effect of the formation of the surface layer. The iron content ratio in the core alloy can be calculated from the composition of the core alloy.

From the aspect of obtaining a surface layer containing iron homogeneously, the core alloy is preferred to contain iron. Of such alloys, the alloy represented by the general formula: $MmNi_aFe_bM_c$, where Mm is a Misch metal or a mixture of rare earth elements, M is at least one selected from the group consisting of Mn, Al, Cu and Co, $0.05 \leq b \leq 0.8$ and $5.0 \leq a+b+c \leq 5.5$, is preferable from the aspect of battery characteristics, particularly cycle life. The range of $0.05 \leq b$ is determined because the battery cycle life is drastically elongated in this range, and a range of $0.1 \leq b$ is more preferred. The range of $b \leq 0.8$ is determined because the discharge capacity of the battery tends to decrease when $0.8 < b$. When $a+b+c < 5.0$, the core alloy tends to be pulverized with repeated charge/discharge cycles for the battery, shortening battery cycle life. When $5.5 < a+b+c$, the battery capacity decreases. In the above general formula, $3.5 < a < 4.5$ and $0.8 \leq c \leq 1.6$ are preferable from the aspects of hydrogen equilibrium pressure of the core alloy, battery capacity and battery cycle life.

As stated before, deposition of a fine crystal of at least one selected from the group consisting of metallic nickel, metallic cobalt, nickel oxide and cobalt oxide between the core alloy and the surface layer is also preferable from the aspect of high rate discharge characteristic of the resulting battery.

For example, alkali treatment of the core alloy represented by the general formula $MmNi_aFe_bM_c$ facilitates deposition of a fine crystal of at least one of metallic nickel, metallic cobalt, nickel oxide and cobalt oxide between the core alloy and the surface layer.

In the following, this area of deposition will be referred to as "Ni-Co layer".

When the core alloy represented by the general formula $MmNi_aFe_bM_c$ is immersed in, for example, an aqueous alkaline solution, the Misch metal, rare earth elements and Mn in the surface portion of the core alloy is converted into an oxide or hydroxide, and Al in the surface portion is dissolved into the aqueous alkaline solution.

Ni does not readily dissolve into the aqueous alkaline solution and remains in the surface portion of the core alloy in the form of a fine crystal of metal and/or oxide. Co partly dissolves into the aqueous alkaline solution but partly remains in the surface portion in the form of a fine crystal of metal and/or oxide like Ni. At that time. Fe existed in the surface portion is deposited and converted into an oxide or hydroxide to form the surface layer. Consequently the Ni-Co layer is formed between the core alloy and the surface layer.

Since Ni and Co can be magnetized, the presence of Ni-Co layer can be confirmed by measuring magnetic susceptibility of the resulting active material. A greater magnetic susceptibility indicates formation of a thick Ni-Co layer. This also indicates that the surface layer comprising iron compound is thick and tight.

From the aspect of large effect on improving the; cycle life, the magnetic susceptibility is preferably in the range of $0.3+A \times 0.06$ emu/g or more, where A is percent by weight of Co in the core alloy. The reason why the above equation is dependent only on the Co content is because Co has a greater saturation magnetization than Ni.

The magnetic susceptibility can be measured using any vibrational sample magnetmeter (VSM) type apparatus. For ordinary skilled in the art the existence of the Ni-Co layer can be confirmed by observing a cross-section of the active material particle with TEM.

The surface layer comprising iron compound can be formed on the surface of the core alloy by a step of mechanically mixing the core alloy with an iron compound having a mean particle size of one-tenth or less, preferably one-twentieth or less the mean particle size of the core alloy. In this case, the core alloy to be used preferably has a mean particle size of 10 to 30 $\mu$m from the aspect of facilitating to form a uniform surface layer on the surface of the core alloy with the iron compound.

It is proper to mix 1 to 10 parts by weight of iron compound with 100 parts by weight of core alloy.

The condition of mechanical mixing varies depending on the mixing manner. When a ball mill is used for mixing, for example, the core alloy is pulverized if the rotating speed or mixing time is increased too much. To the contrary, a shorter mixing time results in low surface iron content ratio.

Applicable mixing apparatus include a mechanofusion device and a theta composer.

Alternatively, the surface layer comprising iron compound can be formed on the surface of the core alloy by the steps of immersing the core alloy in an aqueous solution containing an inorganic acid salt of iron dissolved therein, and adding an aqueous alkaline solution to the aqueous solution containing the core alloy.

Exemplary applicable inorganic acid salts of iron include iron sulfate heptahydrate and iron nitrate nonahydrate and their proper content in the aqueous solution is in a range of 1 to 50 percent by weight.

A proper amount of the aqueous solution, in which 100 parts by weight of core alloy are to be immersed, is in a range of 100 to 500 parts by weight.

Normally, the pH value of the mixture of the aqueous solution containing an inorganic acid salt of iron and the core alloy is 6 to 8 before the addition of the aqueous alkaline solution. The aqueous alkaline solution is gently added to the mixture and stirred well until the pH value of the mixture becomes 12 to 13 in order to obtain an active material by depositing the iron compound on the surface of the core alloy. Then, the active material is washed with water to remove alkali and dried.

The surface layer comprising iron compound can be also formed on the surface of the core alloy by the step of immersing the core alloy containing iron into an aqueous alkaline solution. By this step, the iron compound can be deposited on the surface of the core alloy such that the surface iron content ratio is larger than the iron content ratio in the core alloy.

Suitable core alloy for this process may be exemplified by the alloy represented by the general formula $MmNi_aFe_bM_c$.

Treatment with an aqueous alkaline solution of higher concentration at higher temperature can produce a greater magnetic susceptibility and a thicker Ni-Co layer. More specifically, it is preferable to immerse the core alloy containing iron in an aqueous alkaline solution of 25 to 50 percent by weight at 70 to 105°C. for 10 to 120 minutes.

For this process, among various applicable alkalis such as KOH, NaOH and LiOH, NaOH and LiOH are particularly preferred.

The hydrogen storage alloy electrode can be produced using the obtained active material. For instance, a negative electrode plate can be produced by coating a paste of a mixture containing the active material and other widely used electrode materials on a punched metal sheet, drying and then roll-pressing it.

EXAMPLES

In the following, the active material for a hydrogen storage alloy electrode and the method for producing the same in accordance with the present invention will be described more specifically based on the concrete examples.

First, the method for manufacturing test batteries including the hydrogen storage alloy electrode comprising the active material and the evaluation method of the test batteries will be described.

Method for Manufacturing Test Batteries

Water was added to a powdery mixture of nickel hydroxide, metallic cobalt, cobalt hydroxide and zinc oxide at a weight ratio of 100:7:5:2.5 to make a paste. The paste was filled into a foamed nickel sheet, dried and compressed to make a positive electrode plate having a predetermined thickness,.

Separately, a paste was prepared by mixing one of the sample active materials prepared in the below-mentioned examples and comparative examples, carboxymethyl cellulose (hereinafter abbreviated to "CMC"), a styrene-butadiene copolymer rubber (hereinafter abbreviated to "SBR"), a carbon powder (Ketjenblack) and water at a weight ratio of 100:0.3:1:0.3:20. The resultant paste was coated oh a punched metal sheet, dried and roll-pressed to make a negative electrode plate.

The positive and negative electrode plates thus produced were combined with a nonwoven fabric separator of sulfonated polypropylene and an aqueous alkaline solution as an electrolyte having a specific gravity of 1.3 containing potassium hydroxide to assemble a known AA size cylindrical sealed nickel-metal hydride storage battery (test battery).

Evaluation Method of the Test Batteries.

Cycle life tests for all the test batteries thus produced were performed in an atmosphere at 45°C. to accelerate the tests in order to evaluate the corrosion resistance of the hydrogen storage alloy electrode in a short time. Battery cycle life was evaluated by the cycle number until the discharge capacity decreased down to 80% of the initial capacity by repeating a cycle of a charge at 1 C for 1.2 hours and a discharge at 1 C until the terminal voltage drops to 1 V, with proviso that "C" means the current of $C_n$ A when the nominal capacity of the battery is $C_n$ Ah.

Example 1

Mm, Ni, Mn, Al and Co, where Mm is comprising La, Ce, Nd and Pr, were mixed at a predetermined ratio to make a ingot of a hydrogen storage alloy represented by the formula $MmNi_{3.7}Mn_{0.4}Al_{0.3}Co_{0.6}$ in a high frequency induction furnace. The ingot was heated in an argon atmosphere at 1,050°C. for 10 hours and then was ground into a powder of a hydrogen storage alloy to be used as a core alloy having a mean particle size of 25 μm. 100 G of the core alloy was mixed with 5 g of an $Fe(OH)_3$ powder having a mean particle size of 1 μm for one hour using a ball mill, which gave sample A.

Observation of the particle cross-section of sample A with TEM and analysis with EPMA confirmed the formation of the uniform surface layer comprising iron compound on the core alloy surface. The surface iron content ratio was 10 mol %.

A negative electrode was produced using sample A and a test battery for evaluation was assembled. Evaluation of the battery showed that the discharge capacity decreased down to 80% of the initial capacity at the 300th cycle.

Example 2

Sample B was produced in the same manner as in Example 1, except for the use of 5 g of an $Fe_2O_3$ powder having a mean particle size of 1 μm in place of the $Fe(OH)_3$ powder. The surface iron content ratio was 6 mol %.

Similarly, a negative electrode was produced using sample B and a test battery for evaluation was assembled. Evaluation of the battery showed that the discharge capacity decreased down to 80% of the initial capacity at the 290th cycle.

In the above Examples 1 and 2, when the rotation rate of the ball mill was too fast or the mixing time was too long, the core alloy was pulverized. On the other hand, when the mixing time was too short, it was difficult to obtain uniform surface layer comprising iron compound on the core alloy surface. Therefore, it was necessary to select optimal conditions depending on the type of ball mill.

Similar manipulation for various iron compounds having different mean particle sizes showed that when the iron compound had a mean particle size greater than one-tenth the mean particle size of the core alloy, the formation of the surface layer was unsatisfactory.

The use of a mechanofusion device or theta composer also resulted in uniform surface layer comprising iron compound on the core alloy surface as the use of the ball mill. The test batteries using the samples produced by the above two devices showed almost identical performances to that of the samples prepared by the ball mill.

Example 3

In this example, sample C was produced as follows. To 100 parts by weight of the core alloy of Example 1, water and 3 parts by weight of iron sulfate heptahydrate were added and stirred well. The resultant mixture had a pH value of 8. Then, an aqueous solution containing KOH at a content of 31 wt % was gently added to the mixture and stirred well until a pH of 12 to 13 was attained in order to deposit an iron compound on the core alloy surface. Subsequently, the alloy was washed with water to remove alkali and dried, which gave sample C.

The surface iron content ratio of sample C was 9 mol %. A negative electrode was produced using sample C and a test battery for evaluation was assembled. Evaluation of the battery showed that the discharge capacity decreased down to 80% of the initial capacity at the 350th cycle.

Example 4

Sample D was produced in the same manner as in Example 3, except for the use of iron nitrate nonahydrate in place of iron sulfate heptahydrate. The surface iron content ratio of sample D was 8 mol %. Similarly, a negative electrode was produced using sample D and a test battery for evaluation was assembled. Evaluation of the battery showed that the discharge capacity decreased down to 80% of the initial capacity at the 330th cycle.

Similar observation of the particle cross-section of samples C and D with TEM and analysis with EPMA confirmed the formation of more uniform surface layer comprising, iron compound on the core alloy surfaces than samples A and B.

Example 5

In this example, a core alloy represented by the formula $MmNi_{3.4}Mn_{0.4}Al_{0.3}Co_{0.6}Fe_{0.3}$ was produced in the same manner as in Example 1. The resultant core alloy was. immersed in an aqueous solution containing KOH at a content of 31 wt % at 90°C. and stirred well for one hour and then washed with water, which gave sample E.

Observation of the particle cross-section of sample E with TEM and analysis with EPMA revealed the presence of a surface layer mainly comprising metal, oxide or hydroxide of iron, rare earth elements and Mn on the surface of the core alloy. Also the presence of an interior layer of a fine crystal comprising oxide or hydroxide of Ni and Co was revealed. The most homogeneous iron dispersion in the surface layer was obtained in sample E among samples A to E. Sample E had a surface iron content ratio of 15 mol % and had a magnetic susceptibility of 0.6 emu/g.

A negative electrode was also produced using sample E and a test battery for evaluation was assembled. Evaluation of the battery showed that the discharge capacity decreased down to 80% of the initial capacity at the 400th cycle.

Comparative Example 1

For comparison, a negative electrode was produced using the core alloy of Example 1 represented by the formula $MmNi_{3.7}Mn_{0.4}Al_{0.3}Co_{0.6}$ as it was and a test battery for evaluation was assembled. Evaluation of the battery showed that the discharge capacity decreased down to 80% of the initial capacity at the 200th cycle.

Comparative Example 2

For comparison, a negative electrode was produced using the core alloy of Example 5 represented by the formula $MmNi_{3.4}Mn_0Al_{0.3}Co_{0.6}Fe_{0.3}$ as it was and a test battery for evaluation was assembled. Evaluation of the battery showed that the discharge capacity decreased down to, 80% of the initial capacity at the 210th cycle.

Comparative Example 3

In this comparative example, a negative electrode was produced using a paste of a mixture of the core alloy of Example 1 represented by the formula $MmNi_{3.7}Mn_{0.4}Al_{0.3}Co_{0.6}$, CMC, SBR, carbon powder, $Fe(OH)_3$ and water at a weight ratio of 100:0.3:1:0.3:5:20 and a test battery for evaluation was assembled. Evaluation of the battery showed that the discharge capacity decreased down to 80% of the initial capacity at the 250th cycle.

Comparative Example 4

A negative electrode was produced in the same manner as in Comparative Example 3, except for the use of $Fe_2O_3$ in place of $Fe(OH)_3$ and a test battery for evaluation was assembled. Evaluation of the battery showed that the discharge capacity decreased down to 80% of the initial capacity at the 240th cycle.

Table 1 is a summary of the results of the cycle life test for the batteries of Examples 1 to 5 and comparative examples 1 to 4.

TABLE 1

| Example No. | Cycle life |
| --- | --- |
| 1 | 300 |
| 2 | 290 |
| 3 | 350 |
| 4 | 330 |
| 5 | 400 |
| Comparative Example No. | |
| 1 | 200 |
| 2 | 210 |
| 3 | 250 |
| 4 | 240 |

Table 1 shows that the examples using the hydrogen storage alloy electrodes containing any sample active material in accordance with the present invention have a markedly increased cycle life compared to the comparative examples. Corrosion resistance of the core alloy imparted by the surface layer comprising iron compound on the core alloy surface seems to have contributed to the increased cycle life. The fact that the cycle life is longer in Examples 3 and 4 than in Examples 1 and 2, and even longer in Example 5 than in Examples 3 and 4 suggests that the corrosion resistance is larger in the examples using the active material having the surface layer comprising iron compound more uniformly formed on the core alloy surfaces.

Next, similar evaluation was performed for the core alloys produced by varying the composition, mainly the iron content thereof. The resultant core alloys were subjected to a similar alkali treatment with an aqueous alkaline solution to that of Example 5 which exhibited the longest battery cycle life.

Examples 6 to 26 and Comparative Examples 5 to 7

Various core alloys in the following three alloy systems represented by the formula:
(1) $MmNi_{3.6-x}Mn_{0.4}Al_{0.3}Co_{0.7}Fe_x$,
(2) $MmNi_{4.05-x}Mn_{0.4}Al_{0.35}Co_{0.4}Fe_x$ and
(3) $MmNi_{4.3-x}Mn_{0.45}Al_{0.35}Cu_{0.2}Fe_x$, where x values were 0, 0.05, 0.1, 0.2, 0.3, 0.5, 0.8 or 1.0, were produced. Those core alloys were immersed in an aqueous KOH solution at 90° C. having a specific gravity of 1.3 and stirred well for one hour to obtain active materials. Then, respective negative electrodes were produced and test batteries were assembled using the active materials.

Of the core alloys of the alloy system (1), one having an x value of 0 was classified as Comparative Example 5 and those-having x values of 0.05 or more as Examples 6 to 12 in the ascending order of x. Similarly, of the core alloys of the alloy system (2), one having an x value of 0 was classified as Comparative Example 6 and those having x values of 0.05 or more as Examples 13 to 19 in the ascending order of x. Of the core alloys of the alloy system (3), also one having an x value of 0 was classified as Comparative Example 7 and those having x values of 0.05 or mores as Examples 20 to 26 in the ascending order of x.

Figure 2:
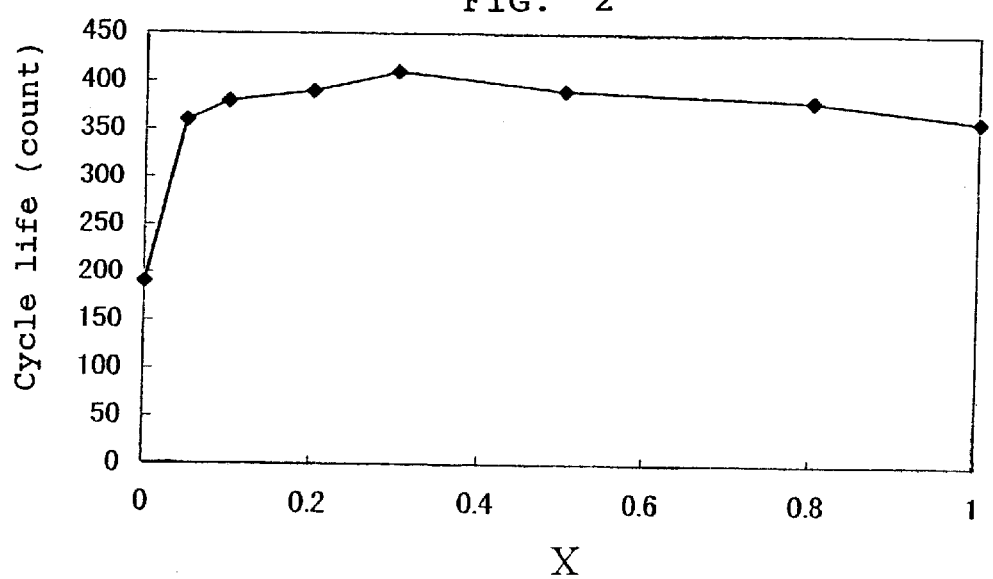
FIG. 2 is a graph illustrating the relation between x value and battery cycle life in the test batteries comprising either active material in accordance with Examples 13 to 19 and Comparative Example 6 produced by immersing the alloys represented by the formula (2) $MmNi_{4.05-x}Mn_{0.4}Al_{0.35}Co_{0.4}Fe_x$ in an aqueous KOH solution at 90°C. having a specific gravity of 1.30 for one hour.
Figure 3:
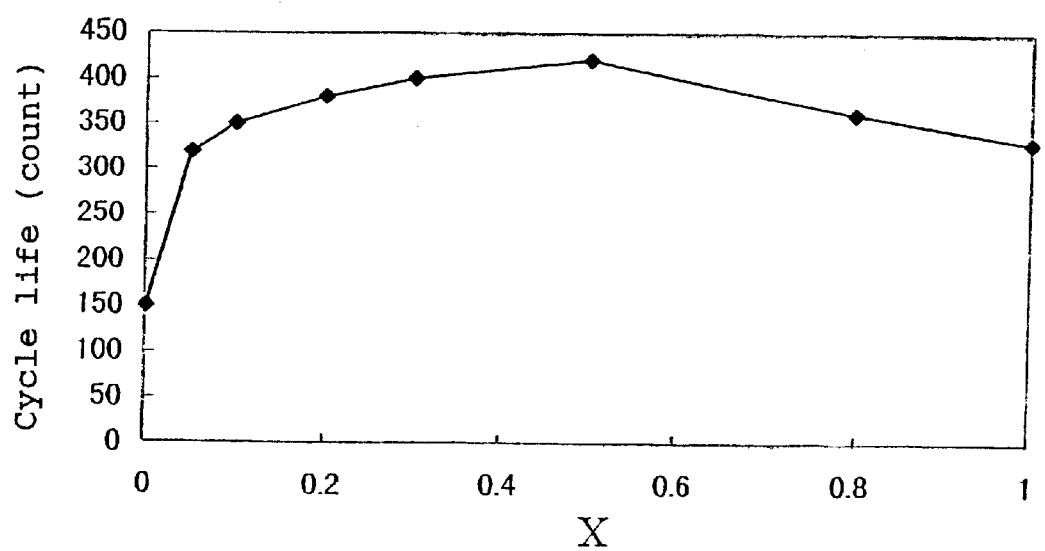
FIG. 3 is a graph illustrating the relation between x value and battery cycle life in the test batteries comprising either active material in accordance with Examples 20 to 26 and Comparative Example 7 produced by immersing the alloys represented by the formula (3) $MmNi_{4.3-x}Mn_{0.45}Al_{0.35}Cu_{0.2}Fe_x$ in an aqueous KOH solution at 90°C. having a specific gravity of 1.30 for one hour.

FIG. 1, 2 and 3 illustrate the relation between x value in the alloy systems (1), (2) and (3) and battery cycle life, i.e., cycle number at which discharge capacity of the battery decreased down to 80% of the initial capacity, respectively.

FIG. 1, 2 and 3 indicate that when the atomic ratios of Fe to Mm in the alloy systems (1), (2) and (3) represented by "x" are in a range of $0.05 \leq x$, more desirably $0.1 \leq x$, the battery cycle life are increased markedly. FIG. 1, 2 and 3 also indicate that a long cycle life can be obtained in A wide range of $0.05 \leq x \leq 1.0$. When $0.8 < x$, on the other hand, the capacity of the core alloy decreased markedly. For instance, in the alloy system (1), the alloy capacity as determined by known PCT measurement (the measurement using the isotherm representing the relation between the amount of absorbed hydrogen and hydrogen pressure) was 290 mAh/g when x=0.5, 280 mAh/g when x=0.8 and 240 mAh/g when x=1.0. Representing the alloy by the general formula $MmNi_aFe_bM_c$, a practical range should be $0.05 \leq b \leq 0.8$ for achieving excellent cycle life and discharge capacity.

Next, conditions for achieving an optimal surface structure of the core alloy were evaluated by arbitrarily varying the concentration and temperature of the aqueous alkaline solution and immersing time in the solution.

Examples 27 to 36

A core alloy represented by the formula $MmNi_{4.0}Mn_{0.5}Al_{0.3}Cu_{0.2}Fe_{0.3}$ was produced in the same manner as in Example 1 and stirred in each of various aqueous alkaline solutions having different concentrations at various temperatures to obtain sample active material. The degree of treatment with the aqueous alkaline solution was assessed based on the magnetic susceptibility of the active material obtained by the treatment of the core alloy. A larger magnetic susceptibility indicates the presence of a thicker layer of a fine crystal comprising a metal and/or an oxide of Ni, that is, a strong alkali treatment. This also suggests formation of a thick and tight surface layer comprising iron compound.

Sample active materials exhibiting a magnetic susceptibility of 0.02, 0.03, 0.05, 0.12, 0.22, 0.30, 0.48, 0.65, 1.62 or 2.7 emu/g have a surface iron content ratio of 5, 5, 6, 6, 7, 10, 15, 20, 30 or 40 mol %, respectively. Examples using those sample active materials were classified as Examples 27 to 36 in this order.

Negative electrodes were produced using the respective active materials and test batteries for evaluation were assembled. Then, cycle life of each battery was measured and the high rate discharge characteristic was assessed for each one. High rate discharge characteristic was expressed as the ratio of capacity of a discharge at 2 C to that of a discharge at 0.2 C, i.e., discharge capacity ratio.

Figure 4:
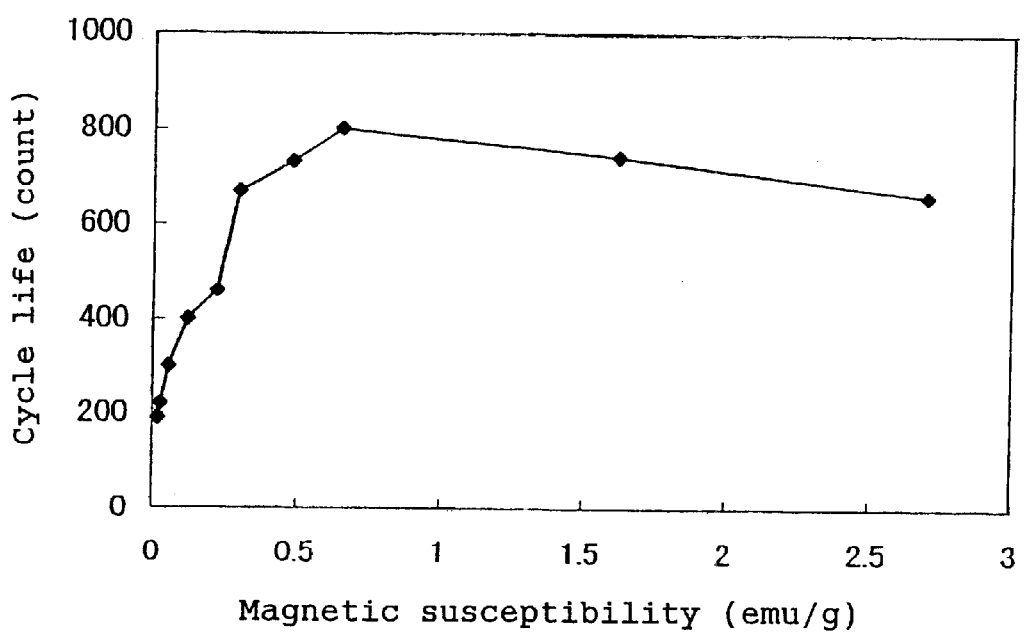
FIG. 4 is a graph illustrating the relation between magnetic susceptibility of the active materials in accordance with Examples 27 to 36 produced by alkali treatment of the alloys represented by the formula $MmNi_{4.0}Mn_{0.5}Al_{0.3}Cu_{0.2}Fe_{0.3}$ and cycle life of the batteries including the same.

FIG. 4 shows the relation between magnetic susceptibility of the sample active material and cycle life of the test battery.

FIG. 4 indicates a particularly long cycle life can be obtained in a range of magnetic susceptibility of 0.3 emu/g or more when the core alloy represented by the formula $MmNi_{4.0}Mn_{0.5}Al_{0.3}Cu_{0.2}Fe_{0.3}$ is used.

Figure 5:
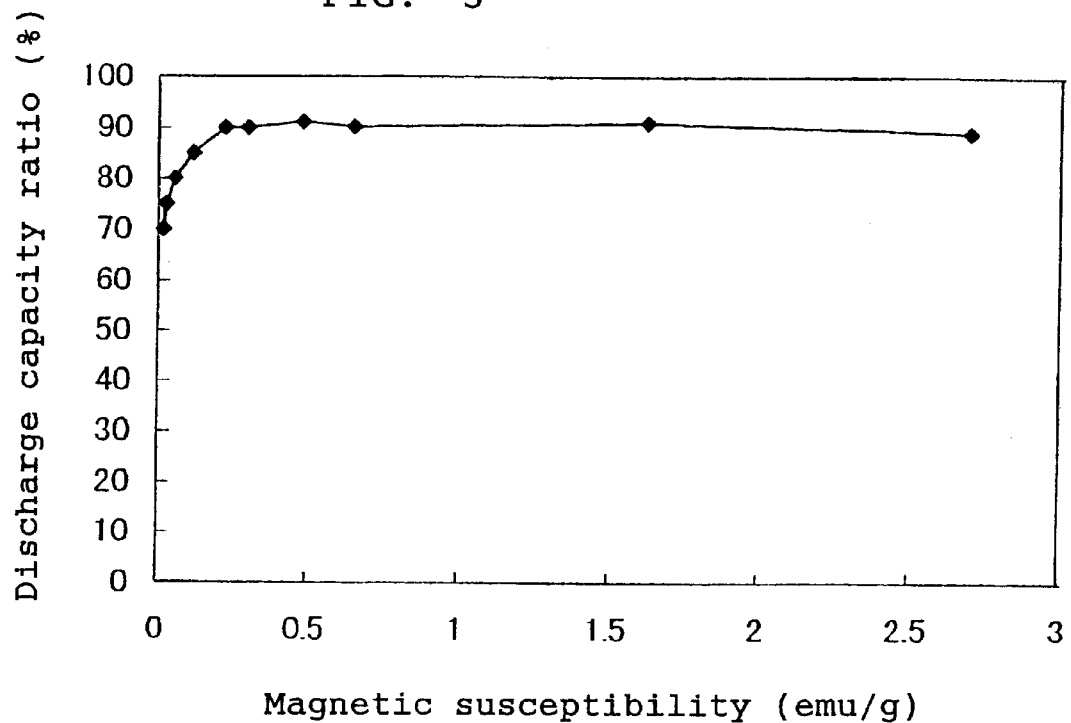
FIG. 5 is a graph illustrating the relation between magnetic susceptibility of the active materials in accordance with Examples 27 to 36 produced by alkali treatment of the alloys represented by the formula $MmNi_{4.0}Mn_{0.5}Al_{0.3}Cu_{0.2}Fe_{0.3}$ and discharge capacity ratio of the batteries including the same.

FIG. 5 shows the relation between magnetic susceptibility of the sample active material and discharge capacity ratio of the test battery.

FIG. 5 also indicates that the high rate discharge characteristic is excellent and stabilized in a range of magnetic susceptibility of 0.25 emu/g or more.

In order to obtain a magnetic susceptibility of 0.3 emu/g or more, it was necessary to treat the core alloy with an aqueous alkaline solution of a considerably high concentration such as 30 to 50 wt % at a considerably high temperature such as 90 to 105° C. Treatment with an aqueous alkaline solution of a high concentration at a high temperature increased the magnetic susceptibility and the surface iron content ratio, and enabled to form a thicker Ni-Co layer. As a result, the battery cycle life was elongated, yielding a high output battery. A higher magnetic susceptibility was obtained by an alkali treatment with aqueous NaOH or LiOH solution than with aqueous KOH solution.

As discussed above, the active material for a hydrogen storage alloy electrode in accordance with the present invention is imparted corrosion resistance by the formation of the surface layer comprising iron compound on the core alloy surface. This effect is particularly prominent when the core alloy contains iron and the surface iron content ratio is greater than the iron content ratio of the core alloy. The use of the hydrogen storage alloy electrode comprising the active material in accordance with the present invention enables to provide a nickel-metal hydride storage battery having a longer cycle life than any conventional battery.

Although the present invention has been described in terms of the presently preferred embodiment, it is to be understood that such disclosure is not to be interpreted as limiting. Various alternations and modifications will no doubt become apparent to those skilled in the art to which the present invention pertains, after having read the above disclosure. Accordingly, it is intended that the appended claims be interpreted as covering all alternations and modifications as fall within the true spirit and scope of the invention.

What is claimed is:

1. An active material for a hydrogen storage alloy electrode, comprising:

a core alloy of a hydrogen storage alloy represented by the general formula, $MmNi_aFe_bM_c$, where Mm is a Misch metal or a mixture of rare earth elements, M is at least one selected from the group consist of Mn, Al, Cu and Co, $0.05 \leq b \leq 0.8$ and $5.0 \leq a+b+c \leq 5.5$;

and a surface layer comprising at least one iron compound formed on the surface of said core alloy, wherein a crystal exists between said core alloy and said surface layer, said crystal comprising at least one selected from the group consisting of metallic nickel, metallic cobalt, nickel oxide and cobalt oxide.

2. The active material for a hydrogen storage alloy electrode in accordance with claim 1, wherein said iron compound is an iron oxide or iron hydroxide.

3. The active material for a hydrogen storage alloy electrode in accordance with claim 1, wherein an iron content ratio in said surface layer is 5 to 40 mol % of all metal content in said surface layer.

4. The active material for a hydrogen storage alloy electrode in accordance with claim 3, wherein said core alloy contains iron at a lower content ratio than said iron content ratio in said surface layer.

5. The active material for a hydrogen storage alloy electrode in accordance with claim 1, wherein said core alloy contains Co and has a magnetic susceptibility of 0.3+A*0.6 emu/g or more, where A is percent by weight of Co in said core alloy.

6. A method for producing an active material for a hydrogen storage alloy electrode comprising the steps of:

immersing a core alloy of a hydrogen storage alloy containing iron into an aqueous alkaline solution to form a surface layer comprising iron compound on the surface of said core alloy, and then washing said core alloy with said surface layer to remove alkali.

7. A method for producing an active material for a hydrogen storage alloy electrode comprising the steps of:

immersing a core alloy of a hydrogen storage alloy containing iron and represented by the general formula: $MmNi_3Fe_bM_c$, where Mm is a Misch metal or a mixture of rare earth elements, M is at least one selected from the group consisting of Mn, Al, Cu and Co, $0.055 \leq b \leq 0.8$ and $5.0 \leq a+b+c \leq 5.5$, into an aqueous alkaline solution to form a surface layer comprising iron compound on the surface of said core alloy, and then washing said core alloy with said surface layer to remove alkali.

* * * * *

UNITED STATES PATENT AND TRADEMARK OFFICE
CERTIFICATE OF CORRECTION

PATENT NO.    : 6,444,361 B1
DATED         : September 3, 2002
INVENTOR(S)   : Katsunori Komori et al.

It is certified that error appears in the above-identified patent and that said Letters Patent is hereby corrected as shown below:

<u>Title page,</u>
Item [56], under FOREIGN PATENT DOCUMENTS, in EP reference "0591606 A1", change the date from "1/1994" to -- 4/1994 --;

<u>Column 12,</u>
Line 11, change "consist" to -- consisting --;
Lines 49-50, change "$0.055 \leq b \leq 0.8$" to -- $0.05 \leq b \leq 0.8$ --.

Signed and Sealed this

First Day of April, 2003

JAMES E. ROGAN
*Director of the United States Patent and Trademark Office*